United States Patent
Song

(10) Patent No.: US 10,421,105 B2
(45) Date of Patent: Sep. 24, 2019

(54) LIGHT ALIGNMENT DEVICE, ASSEMBLY AND METHOD FOR REMOVING LIGHT ALIGNMENT IMPURITIES

(71) Applicant: Shenzhen China Star Optoelectronics Semiconductor Display Technology Co., Ltd., Shenzhen, Guangdong (CN)

(72) Inventor: Yanjun Song, Guangdong (CN)

(73) Assignee: Shenzhen China Star Optoelectronics Semiconductor Display Technology Co., Ltd, Shenzhen, Guangdong (CN)

( * ) Notice: Subject to any disclaimer, the term of this patent is extended or adjusted under 35 U.S.C. 154(b) by 3 days.

(21) Appl. No.: 15/576,963

(22) PCT Filed: Jul. 17, 2017

(86) PCT No.: PCT/CN2017/093070
§ 371 (c)(1),
(2) Date: Nov. 27, 2017

(87) PCT Pub. No.: WO2018/232802
PCT Pub. Date: Dec. 27, 2018

(65) Prior Publication Data
US 2018/0361436 A1   Dec. 20, 2018

(30) Foreign Application Priority Data

Jun. 19, 2017 (CN) .......................... 2017 1 0463534

(51) Int. Cl.
*B08B 5/04* (2006.01)
*G02F 1/1337* (2006.01)
*G02F 1/13* (2006.01)

(52) U.S. Cl.
CPC .............. *B08B 5/04* (2013.01); *G02F 1/1303* (2013.01); *G02F 1/133788* (2013.01); *G02F 1/133723* (2013.01); *G02F 2001/1316* (2013.01)

(58) Field of Classification Search
CPC combination set(s) only.
See application file for complete search history.

(56) References Cited

U.S. PATENT DOCUMENTS

2005/0157246 A1   7/2005 Motomatsu
2016/0291355 A1   10/2016 Liu et al.

FOREIGN PATENT DOCUMENTS

| CN | 101840110 A | 9/2010 |
| JP | 2000107715 A | 4/2000 |
| JP | 2004078244 A | 3/2004 |

*Primary Examiner* — Erin F Bergner
(74) *Attorney, Agent, or Firm* — Andrew C. Cheng

(57) ABSTRACT

A light alignment device, an assembly for removing light alignment impurities, and a related method are disclosed. The assembly includes a removal device having a tunnel inside. A first end of the tunnel is pointed towards a light alignment film. By creating a negative pressure in the tunnel, the removal device draws light alignment impurities into the tunnel.

11 Claims, 2 Drawing Sheets

LIGHT ALIGNMENT DEVICE, ASSEMBLY AND METHOD FOR REMOVING LIGHT ALIGNMENT IMPURITIES

BACKGROUND OF THE INVENTION

1. Field of the Invention

The present disclosure generally relates to display techniques, and particularly relates to a light alignment device, and an assembly and a related method for removing light alignment impurities.

2. The Related Arts

There is an alignment process for liquid crystal molecules in manufacturing a Liquid Crystal Display (LCD) to control their initial and therefore subsequent alignment in the LCD. The existing alignment process usually adopts a light alignment method as shown in FIG. 1. As illustrated, light from a light source 11, after passing through a filter sheet 12 and a polarizer sheet 13, becomes linearly polarized ultraviolet light, which is then applied to an alignment film 14 with sensitizer. Some molecular chains of the alignment film 14 are broken and small molecular impurities 15 are produced, which would cause foreign matter type bright spots and compromise LCD display quality. To prevent these impurities from entering inside of the LCD, conventionally a translucent glass 16 is positioned between the polarizer sheet 13 and the alignment film 14. However, as more impurities 15 are accumulated on the glass 16, light transmittance of the glass 16 becomes lower, inevitably affecting light alignment quality.

SUMMARY OF THE INVENTION

Therefor the present disclosure teaches a light alignment device, an assembly for removing light alignment impurities, and a related method, so as to assure the light alignment quality.

The assembly for removing light alignment impurities includes a removal device having a tunnel inside. A first end of the tunnel is positioned at a distance from an alignment film. By creating a negative pressure inside the tunnel, the assembly draws light alignment impurities into the tunnel.

The light alignment device includes an assembly for removing light alignment impurities. The assembly includes a removal device having a tunnel inside. A first end of the tunnel is positioned at a distance from an alignment film. By creating a negative pressure inside the tunnel, the assembly draws light alignment impurities into the tunnel.

The method for removing light alignment impurities includes the following steps.

A removal device is provided oppositely to a light alignment film so that a first end of a tunnel inside the removal device is pointed towards the light alignment film.

A negative pressure is created in the tunnel of the removal device so that light alignment impurities are drawn into the tunnel.

The advantages of the present disclosure are that light alignment impurities produced from the light alignment film during light alignment process are drawn and removed. These impurities are prevented from accumulating along a shining direction of linearly polarized ultraviolet light, thereby assuring the light alignment quality.

BRIEF DESCRIPTION OF THE DRAWINGS

To make the technical solution of the embodiments according to the present disclosure, a brief description of the drawings that are necessary for the illustration of the embodiments will be given as follows. Apparently, the drawings described below show only example embodiments of the present disclosure and for those having ordinary skills in the art, other drawings may be easily obtained from these drawings without paying any creative effort. In the drawings.

DETAILED DESCRIPTION OF THE PREFERRED EMBODIMENTS

In the following, the present disclosure is explained in details through embodiments and accompanying drawings. It should be understood that not all possible embodiments are disclosed. Other embodiments derived from the following embodiments by a reasonably skilled person in the art without significant inventive effort should be considered to be within the scope of the present disclosure.

Figure 1:
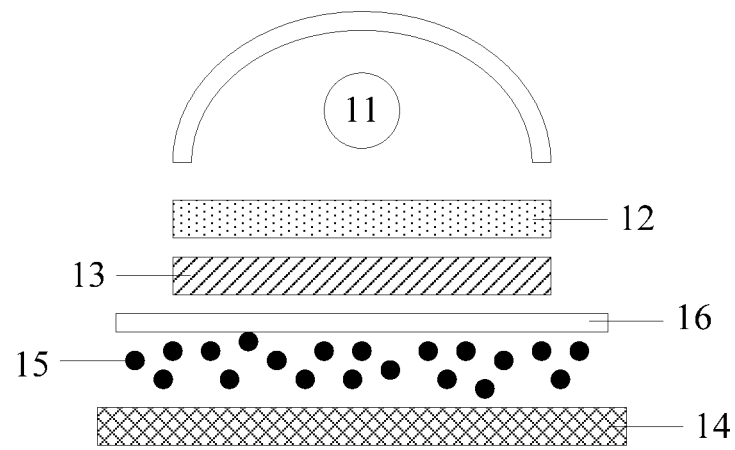
FIG. 1 is a schematic diagram showing a conventional light alignment device.
Figure 2:
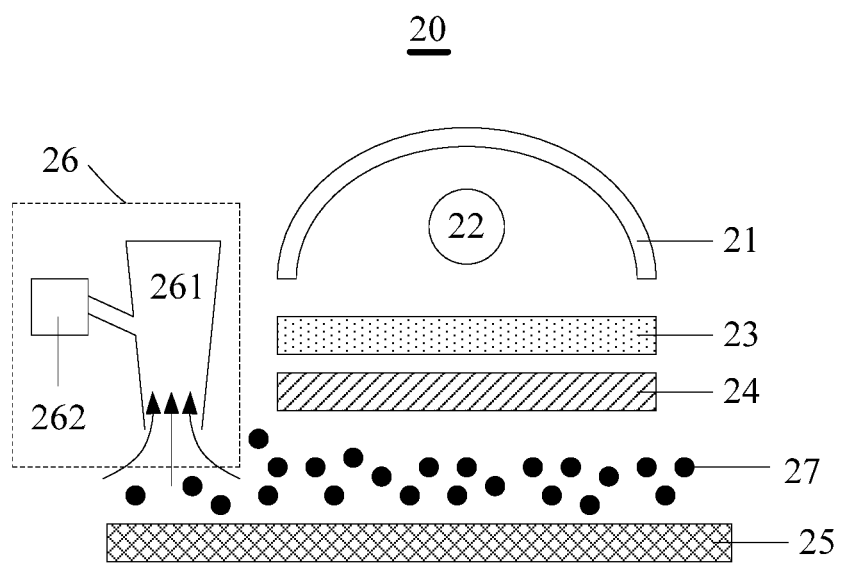
FIG. 2 is a schematic diagram showing a light alignment device according to an embodiment of the present disclosure.

As shown in FIG. 2, a light alignment device 20 according to an embodiment of the present disclosure includes a reflection plate 21, a light source 22, a filter sheet 23, a polarizer sheet 24, an alignment film 25, and an assembly 26 for removing impurities.

The light source 22 is for emitting ultraviolet light.

The reflection plate 21 is for reflecting ultraviolet light originally away from the alignment film 25 back towards the alignment film 25 to enhance utilization of the ultraviolet light.

The filter sheet 23 is positioned in front of the light source 22 for allowing ultraviolet light between a specific wavelength range (e.g., 200~500 nm) to enter the polarizer sheet 24.

The polarizer sheet 24 is positioned in front of the filter sheet 23 for obtaining linearly polarized ultraviolet light. Using the light alignment process of In-Plane Switching (IPS) and Fringe Field Switching (FPS) as example, the polarized sheet 24 allows only ultraviolet light parallel to the polarized sheet 24 to pass through.

The alignment film 25 is made of polymer such as Polyimide (PI) which would produce long-chain molecules after being shined by linearly polarized ultraviolet light. The alignment film 25 would have anisotropy and liquid crystal molecules would be aligned along the direction of the long-chain molecules, thereby achieving light alignment.

The assembly 26 for removing impurities includes a removal device 261 and a collection device 262. The removal device 261 includes a tunnel with two open ends where a first end of them is pointed at the alignment film 25. The collection device 262 has an internal storage space connected to a second end of the tunnel.

In the light alignment process, ultraviolet light from the light source 22, after passing through the filter sheet 23 and the polarizer sheet 23, becomes linearly polarized ultraviolet light, which is then applied to the alignment film 25 with sensitizer. Some molecular chains of the alignment film 25 are broken and small molecular impurities 27 (hereinafter, light alignment impurities) are produced. Under the negative pressure provided by the removal device 261, the light alignment impurities 27 are drawn into the tunnel, and collected in the storage space of the collection device 262.

In an alternative embodiment, a fan and an electrical motor are configured in the removal device 261. Under the electrical motor's driving, the fan draws air in the tunnel and expels the air at high speed from the second end of the tunnel. The inside of the tunnel is vacuumed and air continuous pours into the tunnel from the first end to fill the void. Therefore a high negative pressure is formed between the surrounding and the inside of the tunnel. The light alignment impurities 27 enter the tunnel with the air flow. The light alignment impurities 27 are then kept in the collection device 262 by filter and the filtered air is expelled.

As described, the assembly 26 is able to remove light alignment impurities 27 of the light alignment film 25 by the light alignment process, and prevents the light alignment impurities 27 from accumulation in the direction of the linearly polarized ultraviolet light, thereby guaranteeing the utilization of the ultraviolet light and assuring the quality of the light alignment.

Figure 3:
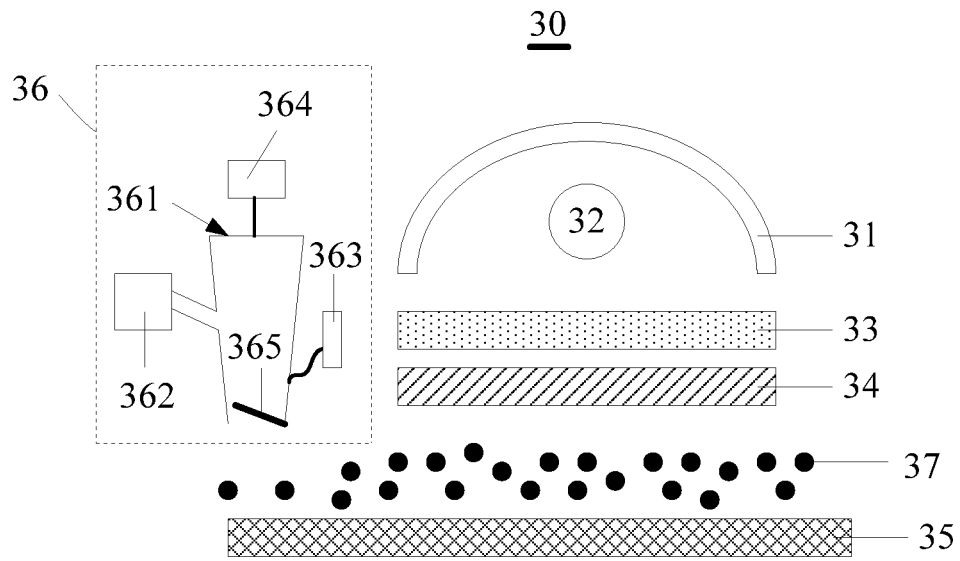
FIG. 3 is a schematic diagram showing a light alignment device according to another embodiment of the present disclosure.

As shown in FIG. 3, a light alignment device 30 according to another embodiment of the present disclosure includes a reflection plate 31, a light source 32, a filter sheet 33, a polarizer sheet 34, an alignment film 35, and an assembly 36 for removing impurities. Except the assembly 36, the components of the light alignment device 30 are identical to those of the light alignment device 20 of the previous embodiment. Their description is therefore omitted.

What is different from the previous embodiment is that the assembly 36, in addition to the removal device 361 and the collection device 362, further includes a photo sensor 363 and a transportation device 364 connected to the removal device 361.

In the light alignment process, the photo sensor 363 detects whether the light alignment film 35 is shined by ultraviolet light. If the photo sensor 363 determines that the light alignment film 35 is shined by ultraviolet light, the transportation device 364 drives the removal device 361 to move. More specifically, the transportation device 364 is an electrical motor moving the removal device 361 to travel across and parallel to the light alignment film 35. Therefore, the first end of the tunnel inside the removal device 361 moves parallel to the light alignment film 35 and immediately removes the light alignment impurities 37.

In addition, the removal device 361 may have a control element 365 configured around the first end of the tunnel. The control element 365 is connected to the photo sensor 363 and, based on the detection by the photo sensor 363 to open or block the tunnel. When the photo sensor 363 detects that the light alignment film 35 is not shined by ultraviolet light, the control element 365 blocks the tunnel, the transportation device 364 keeps the removal device 361 stationary, and the electrical motor and the fan are turned off. When the photo sensor 363 detects that the light alignment film 35 is indeed shined by ultraviolet light, the control element 365 opens the tunnel, the transportation device 364 drives the removal device 361 to move.

During the movement of the removal device 361, to prevent the removal device 361 from hitting the light alignment film 35 due to shaking and drawing PI of the light alignment film 35 that may affect the light alignment quality, a specific distance, such as 5~400 mm, is maintained between the first end of the removal device 361's tunnel and the light alignment film 35.

Figure 4:
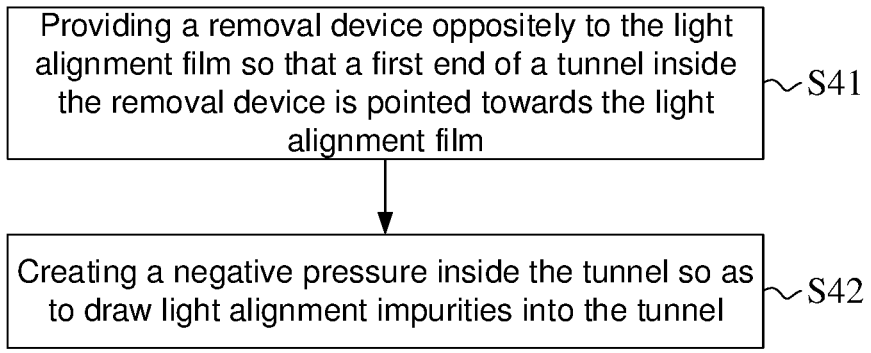
FIG. 4 is a flow diagram showing a method for removing light alignment impurities according to an embodiment of the present disclosure.

As shown in FIG. 4, a method for removing light alignment impurities includes steps S41 and S42 as follows.

In step S41, a removal device is provided opposing a light alignment film so that a first end of a tunnel inside the removal device is pointed towards the light alignment film.

In step S42, a negative pressure is created in the tunnel of the removal device so that light alignment impurities are drawn into the tunnel.

Before conducting the light alignment process, a collection device is connected to a second end of the tunnel so that, during the light alignment process, light alignment impurities are drawn into a storage space of the collection device through the tunnel.

In addition, the removal device is connected to a transportation device which in turn is connected to a photo sensor. Before the step S42, the photo sensor detects whether the light alignment film is shined by ultraviolet light and, if yes, the transportation device moves the removal device during the step S42 so that the first end of the tunnel moves parallel to the light alignment film.

A control element is configured around the first end of the tunnel. The control element is connected to the photo sensor and, based on the detection of the photo sensor, the control element opens or blocks the tunnel. Specifically, when the photo sensor detects that the light alignment film is not shined by ultraviolet light, the control element blocks the tunnel, the transportation device keeps the removal device stationary, and the removal device stops drawing light alignment impurities. When the photo sensor detects that the light alignment film is indeed shined by ultraviolet light, the control element opens the tunnel, the transportation device drives the removal device to move while the removal device draws in the light alignment impurities.

The method may be applied to the assembly 20 or 30 for removing light alignment impurities described above and identical effect may be achieved.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. An assembly for removing light alignment impurities produced from a light alignment film during a light alignment process of a liquid crystal display, the assembly comprising:
    a removal device having a tunnel inside;
    wherein a first end of the tunnel positioned at a distance from the light alignment film; and, by creating a negative pressure inside the tunnel, the assembly draws light alignment impurities into the tunnel;
    a transportation device connected to the removal device; and
    a photo sensor, connected to the transportation device, for detecting whether the light alignment film is shined by ultraviolet light, and wherein, when the photo sensor detects that the light alignment film is shined by the ultraviolet light, the transportation device drives the removal device so that the first end of the tunnel moves parallel to the light alignment film.

2. The assembly as claimed in claim 1, further comprising a collection device connected to a second end of the tunnel.

3. The assembly as claimed in claim 1, wherein the removal device further has a control element configured around the first end of the tunnel; the control element is connected to the photo sensor; and the control element opens or blocks the tunnel according to the photo sensor's detection.

4. The assembly as claimed in claim 1, wherein the distance between the first end of the tunnel and the light alignment film is between 5 and 400 mm.

5. A light alignment device comprising an assembly for removing light alignment impurities produced from a light alignment film during a light alignment process of a liquid crystal display, wherein the assembly comprises:
   a removal device having a tunnel inside and a transportation device connected to the removal device;
   a first end of the tunnel positioned at a distance from the light alignment film; and, by creating a negative pressure inside the tunnel, the assembly draws light alignment impurities into the tunnel, wherein a photo sensor, connected to the transportation device, is configured for detecting whether the light alignment film is shined by ultraviolet light, and wherein, when the photo sensor detects that the light alignment film is shined by the ultraviolet light, the transportation device drives the removal device so that the first end of the tunnel moves parallel to the light alignment film.

6. The light alignment device as claimed in claim 5, wherein the assembly further comprises a collection device connected to a second end of the tunnel.

7. The light alignment device as claimed in claim 5, wherein the removal device further has a control element configured around the first end of the tunnel; the control element is connected to the photo sensor; and the control element opens or blocks the tunnel according to the photo sensor's detection.

8. The light alignment device as claimed in claim 5, wherein the distance between the first end of the tunnel and the light alignment film is between 5 and 400 mm.

9. A method for removing light alignment impurities produced from a light alignment film during a light alignment process of a liquid crystal display, comprising the steps of:
   providing a removal device oppositely to the light alignment film so that a first end of a tunnel inside the removal device is pointed towards the light alignment film;
   creating a negative pressure inside the tunnel so as to draw light alignment impurities into the tunnel;
   providing a photo sensor and a transportation device connected to the photo sensor;
   detecting through the photo sensor whether the light alignment film is shined by ultraviolet light; and
   driving the removal device through the transportation device so that the first end of the tunnel moves parallel to the light alignment film, when the light alignment film is shined by the ultraviolet light.

10. The method as claimed in claim 9, further comprising:
    providing a collection device connected to a second end of the tunnel.

11. The method as claimed in claim 9, further comprising:
    providing a control element configured around the first end of the tunnel and connected to the photo sensor; and
    opening or blocking the tunnel through the control element according to the photo sensor's detection.

\* \* \* \* \*